(12) United States Patent
Watanabe et al.

(10) Patent No.: US 9,499,158 B2
(45) Date of Patent: Nov. 22, 2016

(54) POWER TRANSMISSION DEVICE

(71) Applicants: Takao Watanabe, Nagakute (JP); Eiji Tsuchiya, Nisshin (JP); Tatsuya Miyano, Nagatuke (JP); Akira Murakami, Gotenba (JP); Takahiro Shiina, Susono (JP); Tadashi Fujiyoshi, Susono (JP)

(72) Inventors: Takao Watanabe, Nagakute (JP); Eiji Tsuchiya, Nisshin (JP); Tatsuya Miyano, Nagatuke (JP); Akira Murakami, Gotenba (JP); Takahiro Shiina, Susono (JP); Tadashi Fujiyoshi, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/443,450

(22) PCT Filed: Nov. 8, 2013

(86) PCT No.: PCT/JP2013/080202
§ 371 (c)(1),
(2) Date: May 18, 2015

(87) PCT Pub. No.: WO2014/080775
PCT Pub. Date: May 30, 2014

(65) Prior Publication Data
US 2015/0314772 A1 Nov. 5, 2015

(30) Foreign Application Priority Data
Nov. 20, 2012 (JP) .................... 2012-253958

(51) Int. Cl.
*B60W 20/00* (2016.01)
*B60L 3/06* (2006.01)
(Continued)

(52) U.S. Cl.
CPC ............ *B60W 20/108* (2013.01); *B60K 6/26* (2013.01); *B60K 6/448* (2013.01); *B60L 3/0061* (2013.01); *B60L 3/06* (2013.01);
(Continued)

(58) Field of Classification Search
None
See application file for complete search history.

(56) References Cited

U.S. PATENT DOCUMENTS

| 2009/0247341 A1 | 10/2009 | Abe et al. |
| 2010/0219706 A1 | 9/2010 | Watanabe et al. |
| 2011/0036652 A1 | 2/2011 | Honda et al. |

FOREIGN PATENT DOCUMENTS

| JP | 9 322311 | 12/1997 |
| JP | 2002 135910 | 5/2002 |

(Continued)

OTHER PUBLICATIONS

International Search Report Issued Dec. 24, 2013 in PCT/JP2013/080202 Filed Nov. 8, 2013.

*Primary Examiner* — Justin Holmes
*Assistant Examiner* — Timothy M Hannon
(74) *Attorney, Agent, or Firm* — Oblon, McClelland, Maier & Neustadt, L.L.P.

(57) ABSTRACT

When a drive shaft (37) is driven while the operation of an engine (36) is stopped, the rotation of an input-side rotor (28) is restricted by the engagement of a brake. Further, on the basis of the temperature Temp_SR of a brush (96) acquired by a temperature sensor (97), the distribution of torque Tcoup acting between the input-side rotor (28) and the first output-side rotor (18) and torque Tmg acting between the stator (16) and the second output-side rotor (19) is controlled. Consequently, drive performance when the drive shaft (37) is driven while the operation of the engine (36) is stopped is improved while local overheating of a slip ring (95) is prevented.

5 Claims, 13 Drawing Sheets

(51) Int. Cl.

| | | |
|---|---|---|
| *B60L 3/00* | (2006.01) | |
| *B60L 7/14* | (2006.01) | |
| *B60L 15/20* | (2006.01) | |
| *B60L 11/12* | (2006.01) | |
| *B60L 3/12* | (2006.01) | |
| *B60W 10/08* | (2006.01) | |
| *B60K 6/448* | (2007.10) | |
| *B60K 6/26* | (2007.10) | |
| *B60L 11/14* | (2006.01) | |
| *B60K 6/38* | (2007.10) | |

(52) U.S. Cl.
CPC .. *B60L 3/12* (2013.01); *B60L 7/14* (2013.01); *B60L 11/123* (2013.01); *B60L 11/14* (2013.01); *B60L 15/2009* (2013.01); *B60L 15/2045* (2013.01); *B60W 10/08* (2013.01); *B60W 20/00* (2013.01); *B60K 2006/381* (2013.01); *B60L 2210/40* (2013.01); *B60L 2220/14* (2013.01); *B60L 2220/52* (2013.01); *B60L 2240/12* (2013.01); *B60L 2240/421* (2013.01); *B60L 2240/423* (2013.01); *B60L 2240/425* (2013.01); *B60L 2240/441* (2013.01); *B60L 2240/443* (2013.01); *B60L 2240/445* (2013.01); *B60L 2250/26* (2013.01); *B60W 2510/087* (2013.01); *Y02T 10/6217* (2013.01); *Y02T 10/6243* (2013.01); *Y02T 10/641* (2013.01); *Y02T 10/645* (2013.01); *Y02T 10/7077* (2013.01); *Y02T 10/7241* (2013.01); *Y02T 10/7283* (2013.01); *Y10S 903/902* (2013.01); *Y10T 477/23* (2015.01)

(56) References Cited

FOREIGN PATENT DOCUMENTS

| | | |
|---|---|---|
| JP | 2005 81931 | 3/2005 |
| JP | 2008 132971 | 6/2008 |
| JP | 2009 73472 | 4/2009 |
| JP | 2009 274536 | 11/2009 |
| JP | 2011 230650 | 11/2011 |
| WO | 2009 128288 | 10/2009 |

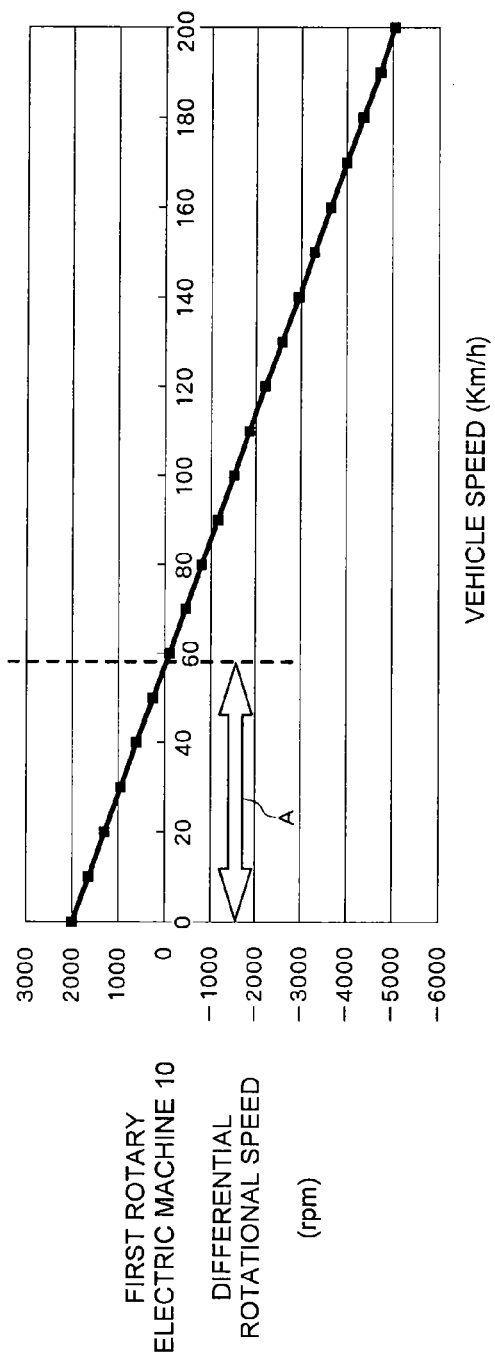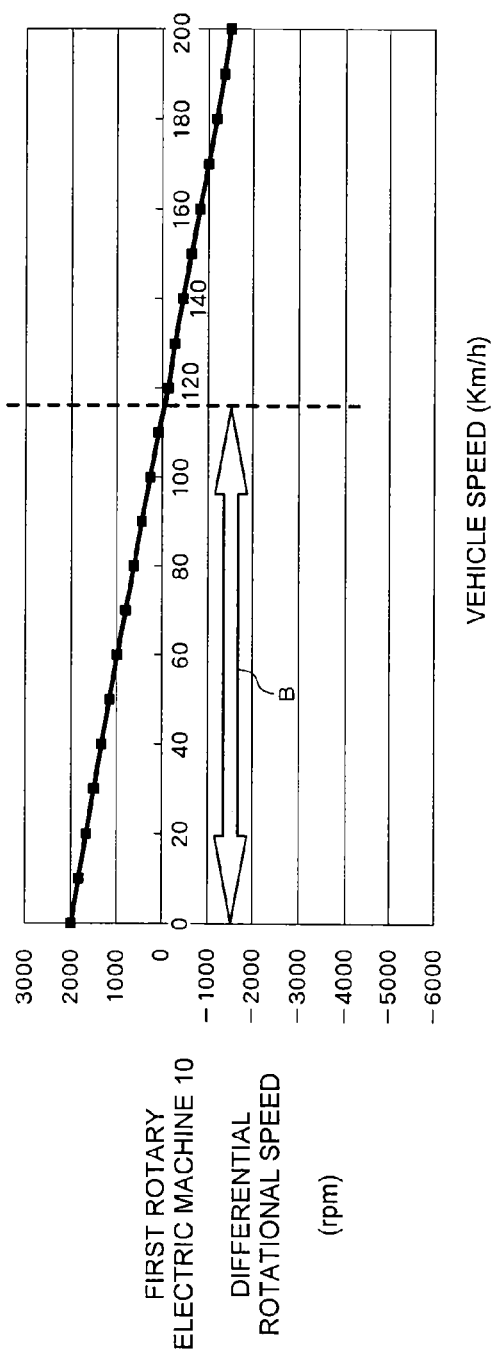

POWER TRANSMISSION DEVICE

TECHNICAL FIELD

The present invention relates to a power transmission device, and more particularly to driving of a drive shaft while the operation of an engine is stopped.

BACKGROUND

Related art concerning a hybrid driving apparatus including an engine and first and second motor generators is disclosed in Patent Literatures 1 and 2. Patent Literatures 1 and 2 disclose the following running modes available for driving a drive shaft: a series running mode for utilizing power of the engine to cause the first motor generator to generate power and then utilizing the generated power to drive the second motor generator to drive the drive shaft; a parallel running mode for driving the drive shaft using power of the engine with a clutch being engaged while assisting driving or generating power using the first and second motor generators; and an EV (Electric Vehicle) running mode for driving the second motor generator with the operation of the engine being stopped, to drive the drive shaft.

PRIOR ART DOCUMENTS

Patent Literatures

[Patent Literature 1] WO 2009/128288
[Patent Literature 2] JP 2011-230650 A
[Patent Literature 3] JP 9-322311 A
[Patent Literature 4] JP 2009-73472 A
[Patent Literature 5] JP 2009-274536 A

SUMMARY OF INVENTION

Technical Problems

In Patent Literatures 1 and 2, the drive torque in the EV running mode for driving the drive shaft with the operation of the engine being stopped is covered by the torque generated by the second motor generator. It is therefore necessary to secure the maximum torque of the second motor generator corresponding to the required maximum drive torque for drive shaft, which makes it difficult to increase the drive performance in the EV running mode without increasing the size of the second motor generator. There is another problem that, when the temperature of the second motor generator rises during the EV running mode due to large current flowing in the second motor generator, for example, in order to prevent overheating of the second motor generator, it is necessary to limit the current in the second motor generator to thereby limit the torque, which results in a reduction in the drive performance of the drive shaft provided by the second motor generator. Also, an attempt to drive the drive shaft not only with the torque of the second motor generator but also with the torque of the first motor generator by means of the engagement of the clutch during the EV running mode would cause the engine to operate following the driving of the first and second motor generators, which leads to a loss in the engine due to friction.

Patent Literature 3 discloses fixing the rotation of a crank shaft of the engine by means of a brake mechanism and causing a clutch motor and an assist motor to output torque acting in a direction opposite to the rotation direction of the engine to a drive shaft during the reverse driving. With the structure of applying current to a winding of a rotor of the clutch motor coupled to the crank shaft of the engine via a brush and a slip ring, however, when causing the clutch motor to generate torque with the rotation of the crank shaft of the engine being fixed, energization points of the slip ring (contact points with the brush) are fixed locally. Increasing the current applied to the winding of the rotor of the clutch motor, in this state, in order to increase the drive torque of the drive shaft to increase the torque of the clutch motor, may lead to local overheating of the slip ring.

It is therefore an advantage of the present invention to increase the drive performance when the drive shaft is driven with the operation of the engine being stopped, while preventing local overheating of the slip ring.

Solution to Problems

In order to accomplish the above advantage, the power transmission device according to the present invention has adopted the following structures.

The power transmission device according to the present invention includes an input-side rotor configured to receive power transmitted from an engine, which includes a rotor conductor which can generate a rotating magnetic field when alternating current flows therethrough, a first output-side rotor configured to be rotatable relative to the input-side rotor and to transmit power to a drive shaft, torque acting between the first output-side rotor and the input-side rotor in response to exertion of the rotating magnetic field generated by the rotor conductor, a stator including a stator conductor which can generate rotating magnetic field when alternating current flows therethrough, a second output-side rotor configured to rotate with the first output-side rotor and transmit power to the drive shaft, torque acting between the second output-side rotor and the stator in response to exertion of the rotating magnetic field generated by the stator conductor, a slip ring electrically connected with the rotor conductor and rotating with the input-side rotor, a brush configured to electrically contact the slip ring, a temperature obtaining section configured to obtain a temperature of either one of the brush and the slip ring, and a restriction mechanism which can restrict rotation of the input-side rotor. When driving the drive shaft with an operation of the engine being stopped, the rotation of the input-side rotor is restricted by the restriction mechanism, and further, based on the temperature obtained by the temperature obtaining section, allocation is controlled between the torque acting between the input-side rotor and first output-side rotor by the alternating current of the rotor conductor with respect to a required torque of the drive shaft, and the torque acting between the stator and the second output-side rotor by the alternating current of the stator conductor with respect to the required torque of the drive shaft.

In accordance with one aspect of the present invention, when driving the drive shaft with the operation of the engine being stopped, if the temperature obtained by the temperature obtaining section is higher than an allowable temperature, the allocation of the torque acting between the input-side rotor and the first output-side rotor by the alternating current of the rotor conductor with respect to the required torque of the drive shaft is decreased to increase the allocation of the torque acting between the stator and the second output-side rotor by the alternating current of the stator conductor with respect to the required torque of the drive shaft, compared to when the temperature obtained by the temperature obtaining section is the allowable temperature or lower.

In accordance with one aspect of the present invention, when driving the drive shaft with the operation of the engine being stopped, if the temperature obtained by the temperature obtaining section is an allowable temperature or lower, the allocation between the torque acting between the input-side rotor and the first output-side rotor by the alternating current of the rotor conductor with respect to the required torque of the drive shaft and the torque acting between the stator and the second output-side rotor by the alternating current of the stator conductor with respect to the required torque of the drive shaft is controlled such that a loss increase ratio with respect to a torque increase of the first output-side rotor and a loss increase ratio with respect to a torque increase of the second output-side rotor are equal to each other.

In accordance with one aspect of the present invention, when driving the drive shaft with the operation of the engine being stopped, if the temperature obtained by the temperature obtaining section is higher than the allowable temperature, the allocation of the torque acting between the input-side rotor and the first output-side rotor by the alternating current of the rotor conductor with respect to the required torque of the drive shaft is decreased to increase the allocation of the torque acting between the stator and the second output-side rotor by the alternating current of the stator conductor with respect to the required torque of the drive shaft, with respect to the torque allocation by which the loss increase ratio of the first output-side rotor with respect to the torque increase and the loss increase ratio of the second output-side rotor with respect to the torque increase are equal to each other.

In accordance with one aspect of the present invention, the first output-side rotor and the second output-side rotor are formed integrally.

Advantageous Effects of the Invention

According to the present invention, rotation of the input-side rotor is restricted by the restriction mechanism, and also torque allocation with respect to the required torque of the drive shaft is performed, based on the temperature of either the brush or the slip ring, between the torque acting between the input-side rotor and the first output-side rotor by the alternating current of the rotor conductor and torque acting between the stator and the second output-side rotor by the alternating current of the stator conductor, so that drive performance can be increased when the drive shaft is driven with the operation of the engine being stopped, while preventing local overheating of the slip ring.

BRIEF DESCRIPTION OF THE DRAWINGS

FIG. 3 View indicating a range of the vehicle speed for performing power generation operation of a first rotary electric machine 10, under the condition that the rotational speed of a first output-side rotor 18 is equal to the rotational speed of a second output-side rotor 19.

FIG. 4 View indicating a range of the vehicle speed for performing power generation operation of the first rotary electric machine 10, under the condition that the rotational speed of the first output-side rotor 18 is a half the rotational speed of the second output-side rotor 19.

DESCRIPTION OF EMBODIMENTS

Preferred embodiments of the present invention will be described in detail with reference to the accompanying drawings.

Figure 1:
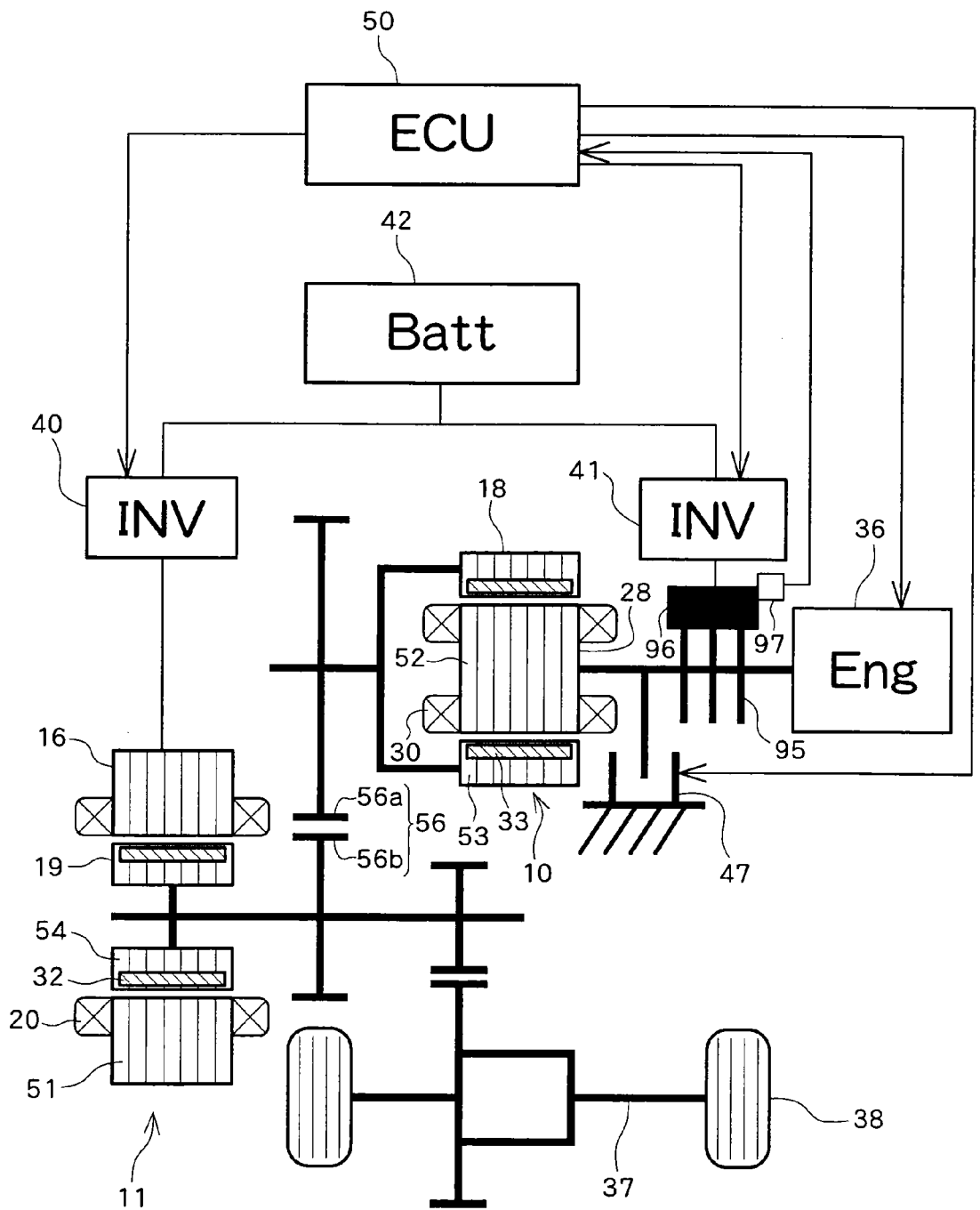
FIG. 1 View schematically illustrating a structure of a hybrid driving apparatus including a power transmission device according to an embodiment of the present invention.

FIG. 1 is a view schematically illustrating a structure of a hybrid driving apparatus including a power transmission device according to an embodiment of the present invention. The hybrid driving apparatus according to the present embodiment includes an engine (internal combustion engine) 36 which is provided as a prime mover capable of generating power (mechanical power), and first and second rotary electric machines 10 and 11 capable of generating power (mechanical power) and generating electricity. The hybrid driving apparatus according to the present embodiment can be used as a power output apparatus for driving a vehicle, for example.

The first rotary electric machine 10 includes a rotatable input-side rotor 28 and a first output-side rotor 18 which is disposed opposite the input-side rotor 28 in the radial direction orthogonal to a rotation axis, with a predetermined gap being formed between the input-side rotor 28 and the first output-side rotor 18. The first output-side rotor 18 is rotatable relative to the input-side rotor 28. In the example illustrated in FIG. 1, the input-side rotor 28 is disposed at a radially inward position with respect to the first output-side rotor 18 so as to face the first output-side rotor 18. The input-side rotor 28 includes a rotor core 52 and rotor windings 30 of a plurality of phases (e.g., three phases) which are arranged on the rotor core 52 along the circumferential direction thereof. When alternating current of a plurality of phases (e.g., three phases) flows in the rotor windings 30 of a plurality of phases, the rotor windings 30 can generate a rotating magnetic field which rotates in the rotor circumferential direction. The first output-side rotor 18 includes a rotor core 53 and a plurality of permanent magnets 33 arranged on the rotor core 53 along the circumferential direction thereof for generating field magnetic flux. The plurality of permanent magnets 33 are disposed on the inner circumferential portion of the rotor core 53 opposite the input-side rotor 28 (rotor core 52).

The second rotary electric machine 11 includes a stator 16 fixed to a stator casing, which is not shown, and a second output-side rotor 19 which is disposed opposite the stator 16 in the diameter direction orthogonal to the rotation axis with a predetermined gap being formed between the second output-side rotor 19 and the stator 16. The second output-side rotor 19 is rotatable relative to the stator 16. In the example illustrated in FIG. 1, the second output-side rotor 19 is disposed at a position radially inward with respect to the stator 16 so as to face the stator 16. The stator 16 includes a stator core 51 and stator windings 20 of a plurality of phases (e.g., three phases) arranged on the stator core 51 along the circumferential direction thereof. When alternating current of a plurality of phases (e.g., three phases) flows in the stator windings 20 of a plurality of phases, the stator windings 20 can generate rotating magnetic field which rotates in the stator circumferential direction. The second output-side rotor 19 includes a rotor core 54 and a plurality of permanent magnets 32 arranged on the rotor core 54 along the circumferential direction thereof for generating field magnetic flux. The plurality of permanent magnets 32 are arranged on the outer circumferential part of the rotor core 54 opposite the stator 16 (stator core 51).

A chargeable/dischargeable power storage device 42 provided as a direct-current power source can be formed by, for example, a secondary cell, for storing electrical energy. An inverter 40 is provided as a first electric power conversion apparatus for performing electric power conversion between the power storage device 42 and the stator windings 20 and can be implemented by a known structure including a switching element and a diode (rectifier element) is connected in anti-parallel with the switching element. With the switching operation of the switching element, the inverter 40 can convert direct-current electric power from the power storage device 42 to alternating current (e.g., three-phase alternating current) and supply the alternating current to each phase of the stator windings 20. The inverter 40 can also convert the alternating current flowing in each phase of the stator windings 20 to direct current, thereby achieving electric power conversion for the electric energy to be collected in the power storage device 42. As such, the inverter 40 can perform bidirectional electric power conversion between the power storage device 42 and the stator windings 20.

A slip ring 95 is mechanically coupled with the input-side rotor 28 and is electrically connected to each phase of the rotor winding 30. A brush 96 whose rotation is fixed, is urged into electrical contact with the slip ring 95. The slip ring 95, while moving slidably with respect to the brush 96 (maintaining the electrical contact with the brush 96), rotates with the input-side rotor 28. The brush 96 is also electrically connected with an inverter 41. A temperature sensor 97 is provided on the brush 96 for detecting the temperature of the brush 96. The inverter 41 is provided as a second electric power conversion device for performing electric power conversion between either one of the power storage device 42 and the inverter 40, and the rotor winding 30, and can be implemented by a known structure including a switching element and a diode (rectifier element) which is connected in anti-parallel to the switching element. With the switching operation of the switching element, the inverter 41 can convert direct-current electric power from the power storage device 42 to alternating current (e.g., three-phase alternating current) and supply the alternating current to each phase of the rotor windings 30, via the brush 96 and the slip ring 95. The inverter 41 can also perform electric power conversion for converting the alternating current flowing in each phase of the rotor windings 30 into direct current. In this case, the alternating current power of the rotor winding 30 is extracted from the slip ring 95 and the brush 96, and the alternating current power thus extracted is converted by the inverter 41 into direct current. The power which has been converted to the direct current in the inverter 41 is then converted by the inverter 40 to the alternating current, which can then be supplied to each phase of the stator windings 20. As such, the inverter 40 can convert one of (at least one of) the direct-current electric power from the inverter 41 and the direct-current electric power from the power storage device 42 to alternating current and supply the alternating current to each phase of the stator windings 20. The inverter 40 can also collect the power converted by the inverter 41 to direct current in the power storage device 42. As described above, the inverter 41 can perform bidirectional electric power conversion between one of the power storage device 42 and the inverter 40 and the rotor windings 30.

As the input-side rotor 28 of the first rotary electric machine 10 and the slip ring 95 are mechanically coupled with the engine 36, power from the engine 36 is transmitted to the input-side rotor 28. Also, as the second output-side rotor 19 of the second rotary electric machine 11 is mechanically coupled with the drive shaft 37, power from the second output-side rotor 19 is transmitted to the drive shaft 37 (wheel 38). Further, as the first output-side rotor 18 of the first rotary electric machine 10 is mechanically coupled with the second output-side rotor 19 of the second rotary electric machine 11 and the drive shaft 37 via the transmission mechanism 56, power from the first output-side rotor 18 is transmitted to the drive shaft 37 via the transmission mechanism 56, and the second output-side rotor 19 rotates in synchronism with the rotation of the first output-side rotor 18. In the example illustrated in FIG. 1, the transmission mechanism 56 is a gear transmission mechanism including a transmission gear 56a and a transmission gear 56b which engage with each other. The transmission gear 56a is mechanically coupled with the first output-side rotor 18 of the first rotary electric machine 10 and the transmission gear 56b is mechanically coupled with the second output-side rotor 19 of the second rotary electric machine 11 and the drive shaft 37. As the diameter (pitch circle diameter) of the transmission gear 56a is larger than the diameter (pitch circle diameter) of the transmission gear 56b, during the rotation of the drive shaft 37 (wheel 38), the power from the first output-side rotor 18 is accelerated by the transmission mechanism 56 and is transmitted to the drive shaft 37, and the rotational speed of the second output-side rotor 19 is higher than the rotational speed of the first output-side rotor 18. The brake 47 can selectively restrict or release the rotation of the engine 36, the input-side rotor 28, and the slip ring 95 by engagement/release thereof. Specifically, engagement of the brake 47 causes the engine 36, the input-side rotor 28, and the slip ring 95 to be fixed to a casing whose rotation is fixed, thereby restricting the rotation of the engine 36, the input-side rotor 28, and the slip ring 95. Release of the brake 47, on the other hand, allows the engine 36, the input-side rotor 28, and the slip ring 95 to rotate.

An electronic control unit 50 controls a switching operation of the switching element of the inverter 40 to control the electric power conversion of the inverter 40, thereby controlling the alternating current flowing in each phase of the stator windings 20. The electronic control unit 50 also controls a switching operation of the switching element of the inverter 41 to control the electric power conversion of the inverter 41, thereby controlling the alternating current flowing in each phase of the rotor windings 30. The electronic control unit 50 also controls the engagement/release switching of the brake 47 and controls the operation state of the engine 36.

The switching operation of the inverter 40 causes the alternating current of a plurality of phases (e.g., three phases) to flow in the stator windings 20 of a plurality of phases, which further causes the stator winding 20 to generate a rotating magnetic field rotating in the circumferential direction of the stator. Then, with the electromagnetic interaction (attraction and repulsion action) between the rotating magnetic field generated in stator windings 20 and the field magnetic flux generated in the permanent magnets 32, torque (magnetic torque) can be exerted on the second output-side rotor 19 for driving the second output-side rotor 19 to rotate. In other words, the power supplied from the power storage device 42 to the stator windings 20 via the inverter 40 can be converted to the power (mechanical power) of the second output-side rotor 19, which enables the second rotary electric machine 11 (the stator 16 and the second output-side rotor 19) to function as a synchronous motor (PM motor section). It is further possible to convert the power of the second output-side rotor 19 to the electric power of the stator winding 20, which can be collected in the power storage device 42 via the inverter 40. As described above, with the structure in which the stator windings 20 of the stator 16 and the permanent magnets 32 of the second output-side rotor 19 are electromagnetically coupled with each other, it is possible to exert the rotating magnetic field generated in the stator winding 20 onto the second output-side rotor 19, thereby allowing the torque (magnetic torque) to act between the stator 16 and the second output-side rotor 19. The electronic control unit 50 can control the switching operation of the inverter 40 to thereby control the amplitude or phase angle of the alternating current to flow in the stator windings 20, for example, thereby controlling the torque (PM motor torque) acting between the stator 16 and the second output-side rotor 19.

With a rotation difference generated between the input-side rotor 28 (rotor windings 30) and the first output-side rotor 18 (permanent magnets 33) by the rotation of the input-side rotor 28 relative to the first output-side rotor 18, an induced electromotive force is generated in the rotor windings 30, and this induced electromotive force causes the induced current (alternating current) to flow in the rotor windings 30, which then generates rotating magnetic field. Further, the electromagnetic interaction between the rotating magnetic field generated by the induced current of the rotor winding 30 and the field magnetic flux of the permanent magnet 33 can cause torque to be exerted onto the first output-side rotor 18, for driving the first output-side rotor 18 to rotate. As described above, in the structure in which the rotor windings 30 of the input-side rotor 28 and the permanent magnets 33 of the first output-side rotor 18 are electromagnetically coupled with each other, torque (magnetic torque) is caused to act between the input-side rotor 28 and the first output-side rotor 18 in accordance with exertion of the rotating magnetic field generated by the rotor winding 30 onto the first output-side rotor 18. It is therefore possible to transmit power (mechanical power) between the input-side rotor 28 and the first output-side rotor 18, so that the first rotary electric machine 10 (the input-side rotor 28 and the first output-side rotor 18) can be caused to function as an induced electromagnetic coupling section.

For generating the torque (electromagnetic coupling torque) using the induced current of the rotor windings 30 between the input-side rotor 28 and the first output-side rotor 18, the electronic control unit 50 performs the switching operation of the inverter 41 so as to allow the induced current to flow in the rotor windings 30. At this time, the electronic control unit 50 can control the alternating current flowing in the rotor windings 30 by the switching operation of the inverter 41 to thereby control the electromagnetic coupling torque acting between the input-side rotor 28 and the first output-side rotor 18. The electronic control unit 50 can also maintain the switching element of the inverter 41 in an off state and stop the switching operation thereof, to thereby prevent the induced current from flowing in the rotor winding 30 and allow no torque to act between the input-side rotor 28 and the first output-side rotor 18.

The operation of the hybrid driving apparatus according to the present embodiment will be described.

Figure 2:
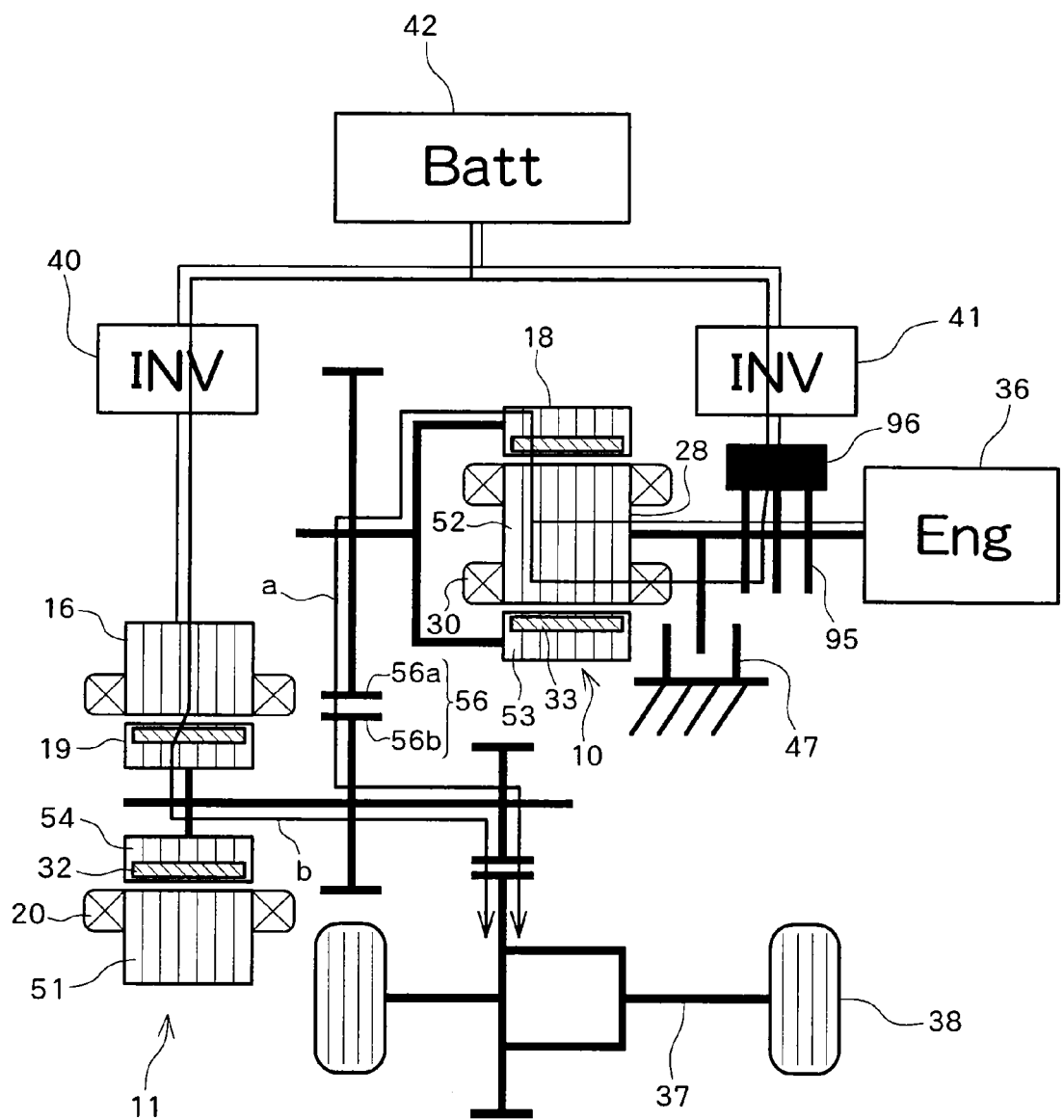
FIG. 2 View for explaining an example operation of driving a drive shaft 37 using power of an engine 36 in the power transmission device according to the embodiment of the present invention.

When the engine 36 generates power with the brake 47 being released, the power of the engine 36 is transmitted to the input-side rotor 28, which is then driven to rotate in the direction of rotation of the engine. When the rotational speed of the input-side rotor 28 reaches the level which is higher than the rotational speed of the first output-side rotor 18, an induced electromotive force occurs in the rotor winding 30. The electronic control unit 50 performs the switching operation of the inverter 41 so as to allow the induced current to flow in the rotor winding 30. This causes electromagnetic interaction between the induced current of the rotor windings 30 and the field magnetic flux of the permanent magnets 33, which further causes the electromagnetic coupling torque in the engine rotation direction from the input-side rotor 28 to be exerted onto the first output-side rotor 18, thereby driving the first output-side rotor 18 to rotate in the engine rotation direction. As such, the electromagnetic coupling between the rotor winding 30 of the input-side rotor 28 and the permanent magnet 33 of the first output-side rotor 18 causes the power from the engine 36 which is transmitted the input-side rotor 28 to be transmitted to the first output-side rotor 18. The power transmitted to the first output-side rotor 18 is then accelerated in the transmission mechanism 56 and further transmitted to the drive shaft 37 (wheel 38), as indicated by an arrow "a" in FIG. 2, for use in normal rotation driving of load, such as forward driving of the vehicle, for example. It is therefore possible to use the power of the engine 36 to drive the wheel 38 to rotate in the direction of normal rotation, so that the vehicle can be driven in the forward direction. Further, as the rotation difference between the input-side rotor 28 and the first output-side rotor 18 is allowable, stall of the engine 36 can be prevented even if the rotation of the wheel 38 is stopped. This allows the first rotary electric machine 10 to function as a starting device, eliminating the need to provide a separate starting device, such as a clutch, a torque converter, or the like.

Further, the alternating current power generated in the rotor windings 30 can be extracted via the slip ring 95 and the brush 96. The alternating current power which is extracted is then converted to direct current by the inverter 41. When, with the switching operation of the inverter 40, the direct-current electric power from the inverter 41 is converted to alternating-current by the inverter 40 and then supplied to the stator winding 20, the alternating current flows in the stator winding 20 and the rotating magnetic field is formed in the stator 16. With the electromagnetic interaction between this rotating magnetic field of the stator 16 and the field magnetic flux of the permanent magnet 32 of the second output-side rotor 19, it is possible to cause the torque in the same direction as the rotation direction of the engine, from the stator 16, to be exerted onto the second output-side rotor 19, and the power of the second output-side rotor 19 is transmitted to the drive shaft 37, as indicated by an arrow "b" in FIG. 2. This operation enables implementation of a torque amplification function to amplify the torque in the direction of normal rotation of the drive shaft 37. It is also possible to collect the electric power which has been extracted from the rotor winding 30 via the slip ring 95 and the brush 96, and converted to direct current by the inverter 41, in the power storage device 42. In this case, the power of the engine 36 becomes greater than the power of the drive shaft 37 (wheel 38), and it is possible to operate the engine 36 at an operating point where the thermal efficiency of the engine 36 is high, especially during the light load running for which the torque required for the drive shaft 37 is small.

Further, controlling the switching operation of the inverter 40 such that power is supplied from the power storage device 42 to the stator winding 20 enables rotation driving of the wheel 38 in the direction of normal rotation by using the power of the engine 36, and also enables assist for the rotation driving of the wheel 38 in the direction of normal rotation with the power of the second output-side rotor 19 which is generated by using power supply to the stator winding 20. In this case, the power of the engine 36 becomes smaller than the power of the drive shaft 37 (wheel 38), and it is possible to operate the engine 36 at the operating point where the thermal efficiency of the engine 36 is high, especially during the high load running for which the torque required for the drive shaft 37 is high.

In a case where electromagnetic coupling torque is generated between the first output-side rotor 18 and the input-side rotor 28 and the power of the engine 36 is transmitted to the drive shaft 37, when the rotational speed of the input-side rotor 28 is higher than the rotational speed of the first output-side rotor 18, the power generation operation of the first rotary electric machine 10 is performed such that the power from the rotor winding 30 is collected. In order to exert torque from the input-side rotor 28 onto the first output-side rotor 18 when the rotational speed of the first output-side rotor 18 is higher than the rotational speed of the input-side rotor 28, on the other hand, it is necessary to supply power to the rotor winding 30 to thereby carry out power running of the first rotary electric machine 10. At this time, if it is attempted to cover the power supply to the rotor winding 30 only by the power generated by the stator winding 20 obtained by the power generation operation of the second rotary electric machine 11, so-called power circulation would occur. Specifically, in the power circulation, a part of the power of the second output-side rotor 19 for driving the drive shaft 37 is converted to the generated power of the stator winding 20, and the power generated by the stator winding 20 is supplied to the rotor winding 30 to allow the first output-side rotor 18 to generate power to thereby drive the drive shaft 37, which results in a reduction in the mechanical efficiency of power transmission. In the example structure illustrated in FIG. 1, on the other hand, the transmission mechanism 56 is an acceleration mechanism, and the rotational speed of the first output-side rotor 18 is lower than the rotational speed of the second output-side rotor 19 during rotation of the drive shaft 37. Accordingly, the rotational speed of the input-side rotor 28 (engine 36) is higher than the rotational speed of the first output-side rotor 18, i.e., it is possible to expand the range of the vehicle speed (the range of the rotational speed of the drive shaft 37) within which the power generation operation of the first rotary electric machine 10 is performed toward the higher vehicle speed range side. This can make the range of the vehicle speed in which the power circulation would not occur expand toward the higher vehicle speed range side, to thereby increase the mechanical efficiency of power transmission. For example, under the condition that the rotational speed of the first output-side rotor 18 is equal to the rotational speed of the second output-side rotor 19, the range of the vehicle speed in which the power generation operation of the first rotary electric machine 10 is performed is limited to the range indicated by arrow A in FIG. 3, whereas under the condition that the rotational speed of the first output-side rotor 18 is half the rotational speed of the second output-side rotor 19 (the velocity ratio of the transmission mechanism 56 is 2), the range of the vehicle speed in which the power generation operation of the first rotary electric machine 10 is performed can be expanded to the range indicated by arrow B in FIG. 4.

As the transmission mechanism 56 is an acceleration mechanism, it is possible to reduce the maximum output of the first rotary electric machine 10. The maximum output of the first rotary electric machine 10 is generally determined by a product of the maximum torque and the rotational speed which maintains the maximum torque. The maximum torque of the first rotary electric machine 10 is determined by the maximum torque of the engine 36, and the maximum rotational speed (absolute value) of the first rotary electric machine 10 is variable in accordance with the velocity ratio of the transmission mechanism 56. The greater the velocity ratio of the transmission mechanism 56, the smaller the maximum rotational speed of the first rotary electric machine 10 can be, and the smaller the maximum output of the first rotary electric machine 10 can be.

Figure 5:
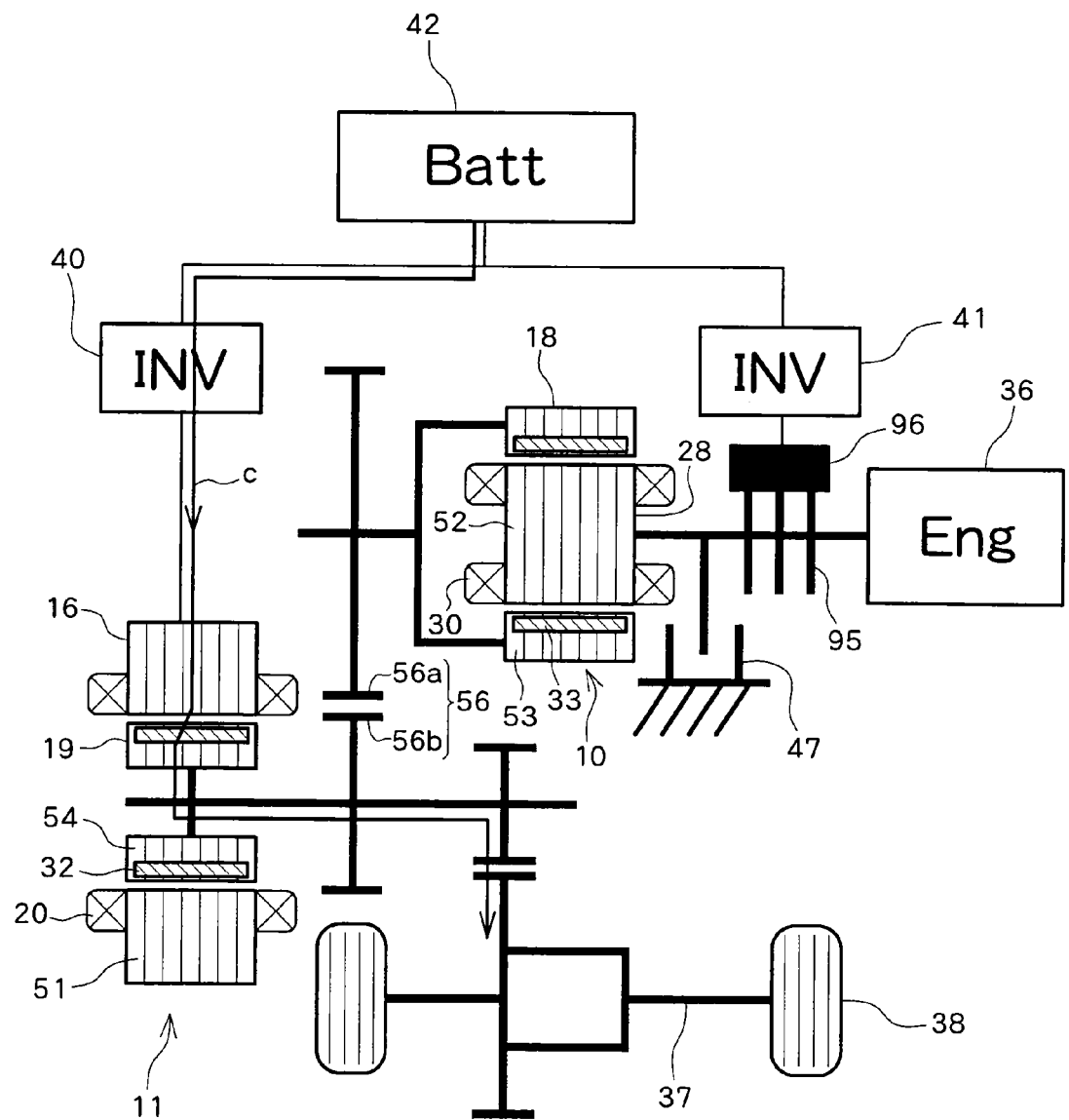
FIG. 5 View for explaining an example operation of driving the drive shaft 37 with the operation of the engine 36 being stopped in the power transmission device according to the embodiment of the present invention.

According to the present embodiment, it is also possible to perform EV (Electric Vehicle) running in which the electric power of the power storage device 42 is used to drive the drive shaft 37 (wheel 38) with the operation of the engine 36 being stopped. For example, the electronic control unit 50 can control the switching operation of the inverter 40 to convert the direct-current electric power from the power storage device 42 to the alternating current, and supply the alternating current to the stator winding 20, such that torque Tmg from the stator 16 is exerted onto the second output-side rotor 19 by the alternating current of the stator winding 20, thereby driving the drive shaft 37, as indicated by an arrow "c" in FIG. 5. As such, EV running can be performed. Hereinafter, an EV running mode in which torque Tmg is caused to act between the stator 16 and the second output-side rotor 19 by the alternating current of the stator winding 20 to thereby drive the drive shaft 37 will be referred to as a "PM motor driving mode". In the PM motor drive mode, it is also possible to control the switching operation of the inverter 40 such that electric power from the stator winding 20 can be collected, so that regenerative running can be performed in which the torque Tmg in the deceleration direction, from the stator 16, is exerted onto the second output-side rotor 19 to thereby decelerate the drive shaft 37 (wheel 38).

Figure 6:
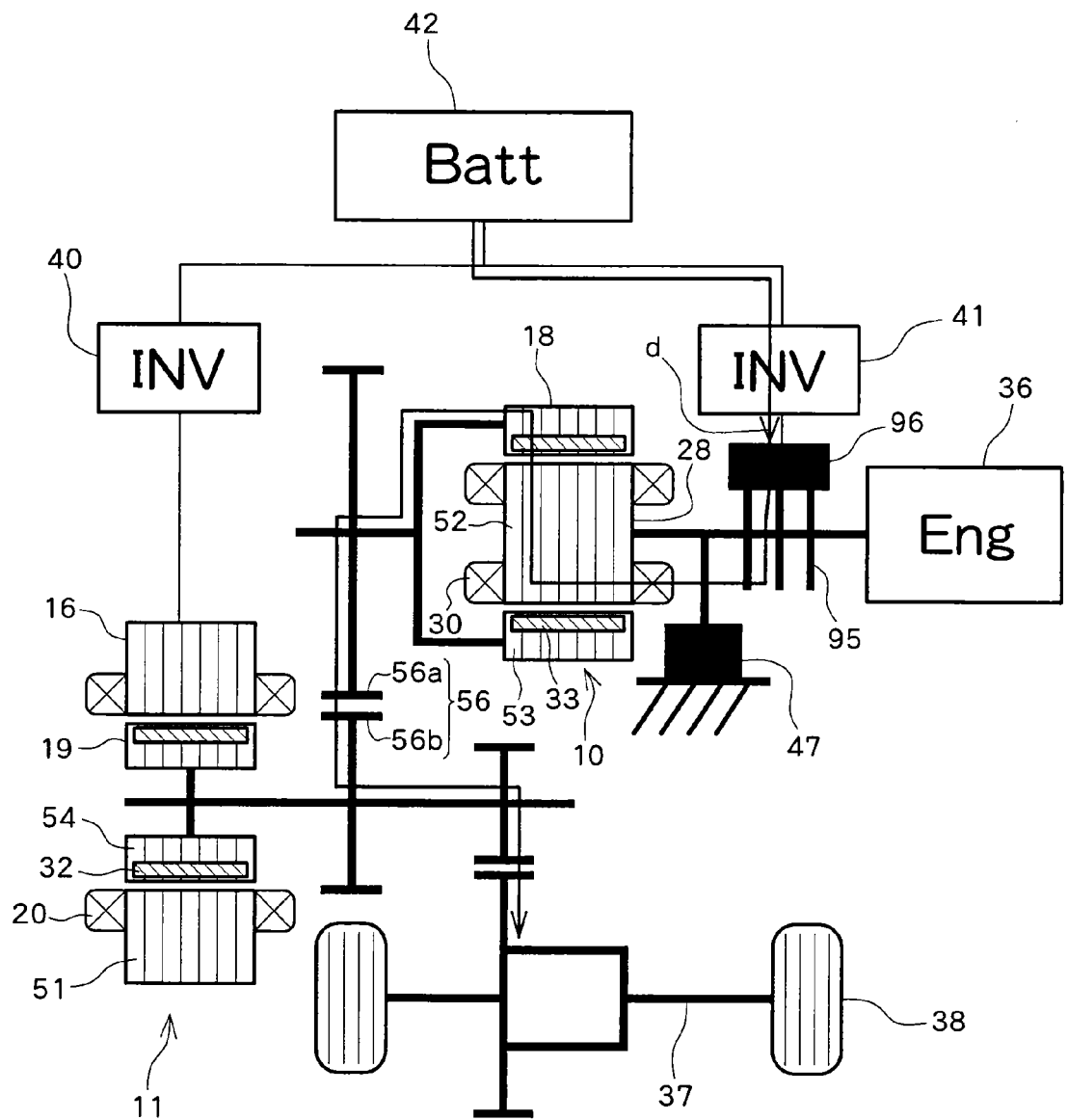
FIG. 6 View for explaining another example operation of driving the drive shaft 37 with the operation of the engine 36 being stopped in the power transmission device according to the embodiment of the present invention.

The electronic control unit 50 can also control the switching operation of the inverter 41 to convert the direct-current electric power from the power storage device 42 to the alternating current and supply the alternating current to the rotor winding 30, with the rotation of the engine 36 and the input-side rotor 28 being restricted by engagement of the brake 47, so that torque Tcoup from the input-side rotor 28 is exerted onto the first output-side rotor 18 by the alternating current of the rotor winding 30, thereby driving the drive shaft 37, as indicated by an arrow "d" in FIG. 6. This operation also enables EV running. Hereinafter, an EV running mode in which torque Tcoup is caused to act between the input-side rotor 28 and the first output-side rotor 18 by the alternating current of the rotor winding 30 to drive the drive shaft 37 will be referred to as an electromagnetic coupling driving mode. In the electromagnetic coupling driving mode, it is also possible to control the switching operation of the inverter 41 such that electric power from the rotor winding 30 is collected, thereby performing regenerative running in which the torque Tcoup in the deceleration direction, from the input-side rotor 28, is exerted onto the first output-side rotor 18 to decelerate the drive shaft 37.

Figure 7:
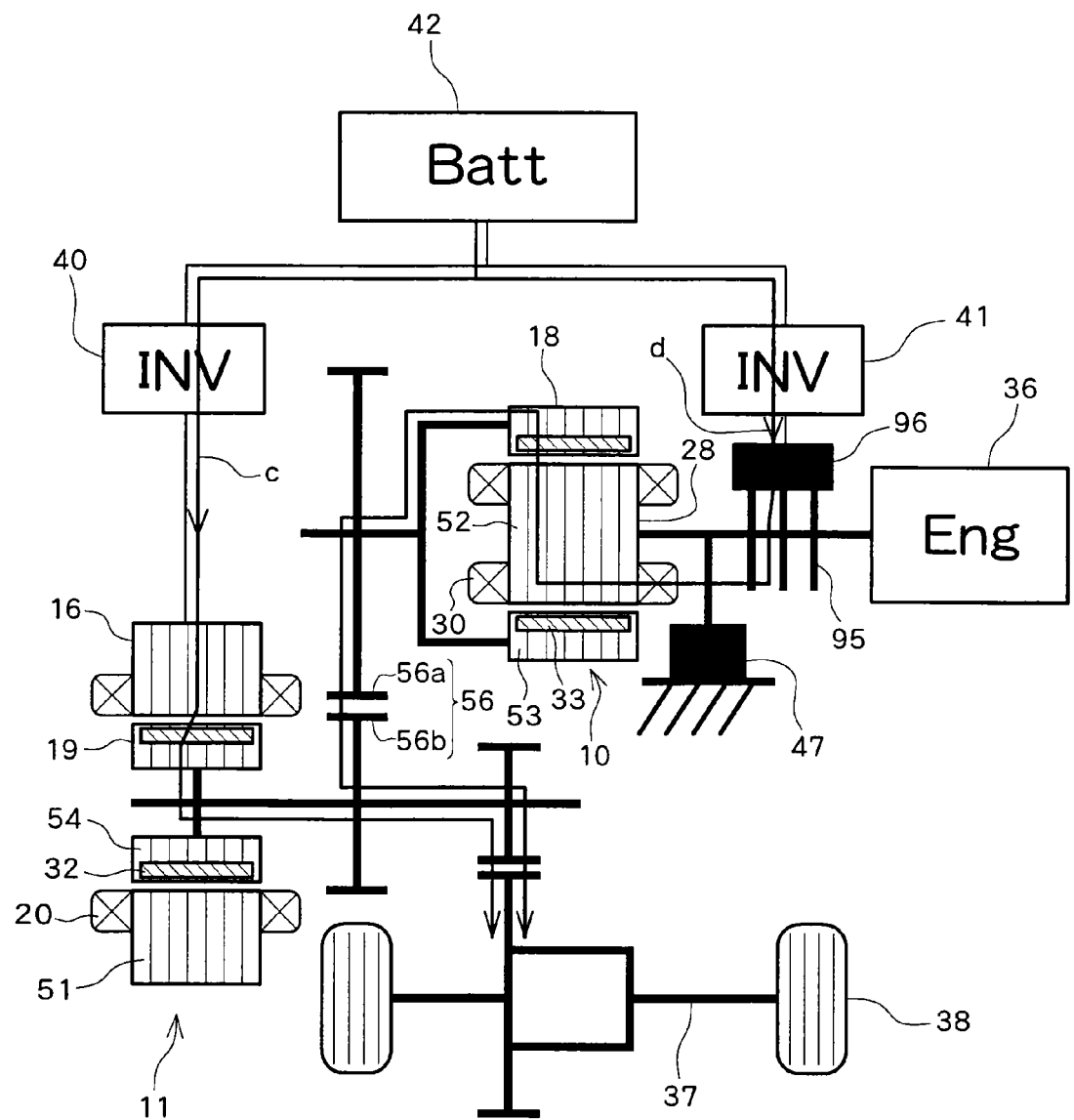
FIG. 7 View for explaining another example operation of driving the drive shaft 37 with the operation of the engine 36 being stopped in the power transmission device according to the embodiment of the present invention.

The electronic control unit 50 can also control the switching operations of the inverters 40 and 41 to convert the direct-current electric power from the power storage device 42 to the alternating current and supply the alternating current to the stator winding 20 and the rotor winding 30, with the rotation of the engine 36 and the input-side rotor 28 being restricted by engagement of the brake 47, so that torque Tmg from the stator 16 is exerted onto the second output-side rotor 19 by the alternating current of the stator winding 20, and also torque Tcoup from the input-side rotor 28 is exerted onto the first output-side rotor 18 by the alternating current of the rotor winding 30, thereby driving the drive shaft 37 as indicated by arrows "c" and "d" in FIG. 7. This operation also enables EV running. Hereinafter, an EV running mode in which the torque Tmg is caused to act between the stator 16 and the second output-side rotor 19 by the alternating current of the stator winding 20, and the torque Tcoup is caused to act between the input-side rotor 28 and the first output-side rotor 18 by the alternating current of the rotor winding 30, to thereby drive the drive shaft 37, will be referred to as a PM motor+ electromagnetic coupling driving mode. In the PM motor+ electromagnetic coupling driving mode, it is also possible to control the switching operation of the inverter 41 so as to collect electric power from the stator winding 20 and the rotor winding 30, so that regenerative running can be performed in which the torque Tmg in the deceleration direction, from the stator 16, is exerted onto the second output-side rotor 19 and also the torque Tcoup in the deceleration direction, from the input-side rotor 28, is exerted onto the first output-side rotor 18 to thereby decelerate the drive shaft 37.

In the present embodiment, when performing the EV running in which the drive shaft 37 is driven with the operation of the engine 36 being stopped, any two or more of the PM motor driving mode, the electromagnetic coupling driving mode, and the PM motor+ electromagnetic coupling driving mode are selectively executed in a switching manner. When the torque required for the drive shaft 37 (wheel 38) is the predetermined torque Trq1 or less, for example, the PM motor driving mode is executed to cover the required torque for the drive shaft 37 with the torque Tmg from the stator 16 which is exerted onto the second output-side rotor 19. When the torque required for the drive shaft 37 is greater than the predetermined torque Trq1, the PM motor+ electromagnetic coupling driving mode is executed to cover the required torque for the drive shaft 37 with the torque Tmg from the stator 16 which is exerted onto the second output-side rotor 19 and the torque Tcoup from the input-side rotor 28 which is exerted onto the first output-side rotor 18. This structure can increase the maximum drive torque of the drive shaft 37 during the EV running, and can also increase the maximum regenerative torque of the drive shaft 37 during the regenerative running. It is also possible to reduce the maximum output of the second rotary electric machine 11 and the electric capacity of the inverter 40, so that the costs for the second rotary electric machine 11 and the inverter 40 can be reduced. Further, when the required torque of the drive shaft 37 is the predetermined torque Trq1 or less, the PM motor driving mode is selected to cause torque Tmg to act between the stator 16 and the second output-side rotor 19 by the alternating current of the stator winding 20 with a higher priority than the torque Tcoup between the input-side rotor 28 and the first output-side rotor 18 by the alternating current of the rotor winding 30, so that the frequency of current application to the slip ring 95 and the brush 96 can be reduced to thereby prevent local overheating of the slip ring 95. In the PM motor+ electromagnetic coupling driving mode, it is similarly possible to make the allocation of the torque Tmg between the stator 16 and the second output-side rotor 19 greater than the allocation of the torque Tcoup between the input-side rotor 28 and the first output-side rotor 18 to thereby prevent local overheating of the slip ring 95. Alternatively, it is also possible to execute the electromagnetic coupling driving mode when the torque required for the drive shaft 37 is the predetermined torque Trq1 or less, and execute the PM motor+ electromagnetic coupling driving mode when the torque required for the drive shaft 37 is greater than the predetermined torque Trq1. In the electromagnetic coupling driving mode and the PM motor+ electromagnetic coupling driving mode, as the engine 36 does not co-rotate with driving of the first output-side rotor 18, loss in the engine 36 caused by friction would not occur.

If, during execution of the PM motor driving mode, the temperature of the second rotary electric machine 11 (the temperature of the stator winding 20, for example) exceeds a predetermined temperature $\tau s1$, it is possible to change the mode to the electromagnetic coupling driving mode. On the other hand, if, during execution of the electromagnetic coupling driving mode, the temperature of the first rotary electric machine 10 (the temperature of the rotor winding 30, for example) exceeds the predetermined temperature $\tau s1$, it is possible to change the mode to the PM motor driving mode. This structure makes it possible to perform the EV running while preventing overheating of the second rotary electric machine 11 (e.g. stator winding 20) and the first rotary electric machine 10 (e.g. rotor winding 30). Further, if, during execution of the PM motor driving mode, the temperature of the inverter 40 (the temperature of the switching element) exceeds a predetermined temperature $\tau s2$, it is possible to change the mode to the electromagnetic coupling driving mode, and if, during execution of the electromagnetic coupling driving mode, the temperature of the inverter 41 (the temperature of the switching element) exceeds the set temperature τs2, it is possible to change the mode to the PM motor driving mode. This structure makes it possible to perform the EV running while preventing overheating of the inverters 40 and 41. It is also possible to change the PM motor driving mode to the electromagnetic coupling driving mode when the PM motor driving mode is continuously executed for a predetermined time period ts1, and change the electromagnetic coupling driving mode to the PM motor driving mode when the electromagnetic coupling driving mode is continuously executed for a predetermined time period ts2. This structure also enables the EV running while preventing overheating of the first and second rotary electric machines 10 and 11 and the inverters 40 and 41. It is further possible to set the relationship of ts1>ts2 such that the torque Tmg between the stator 16 and the second output-side rotor 19 is caused to act with a higher priority than the torque Tcoup between the input-side rotor 28 and the first output-side rotor 18, thereby reducing the frequency of application of current to the slip ring 95 and the brush 96 to thereby prevent the local overheating of the slip ring 95. When changing the PM motor driving mode to the electromagnetic coupling driving mode, it is possible to gradually decrease the torque Tmg between the stator 16 and the second output-side rotor 19, while gradually increasing the torque Tcoup between the input-side rotor 28 and the first output-side rotor 18. When changing the electromagnetic coupling driving mode to the PM motor driving mode, it is possible to gradually decrease the torque Tcoup between the input-side rotor 28 and the first output-side rotor 18 while gradually increasing the torque Tmg between the stator 16 and the second output-side rotor 19.

Figure 8:
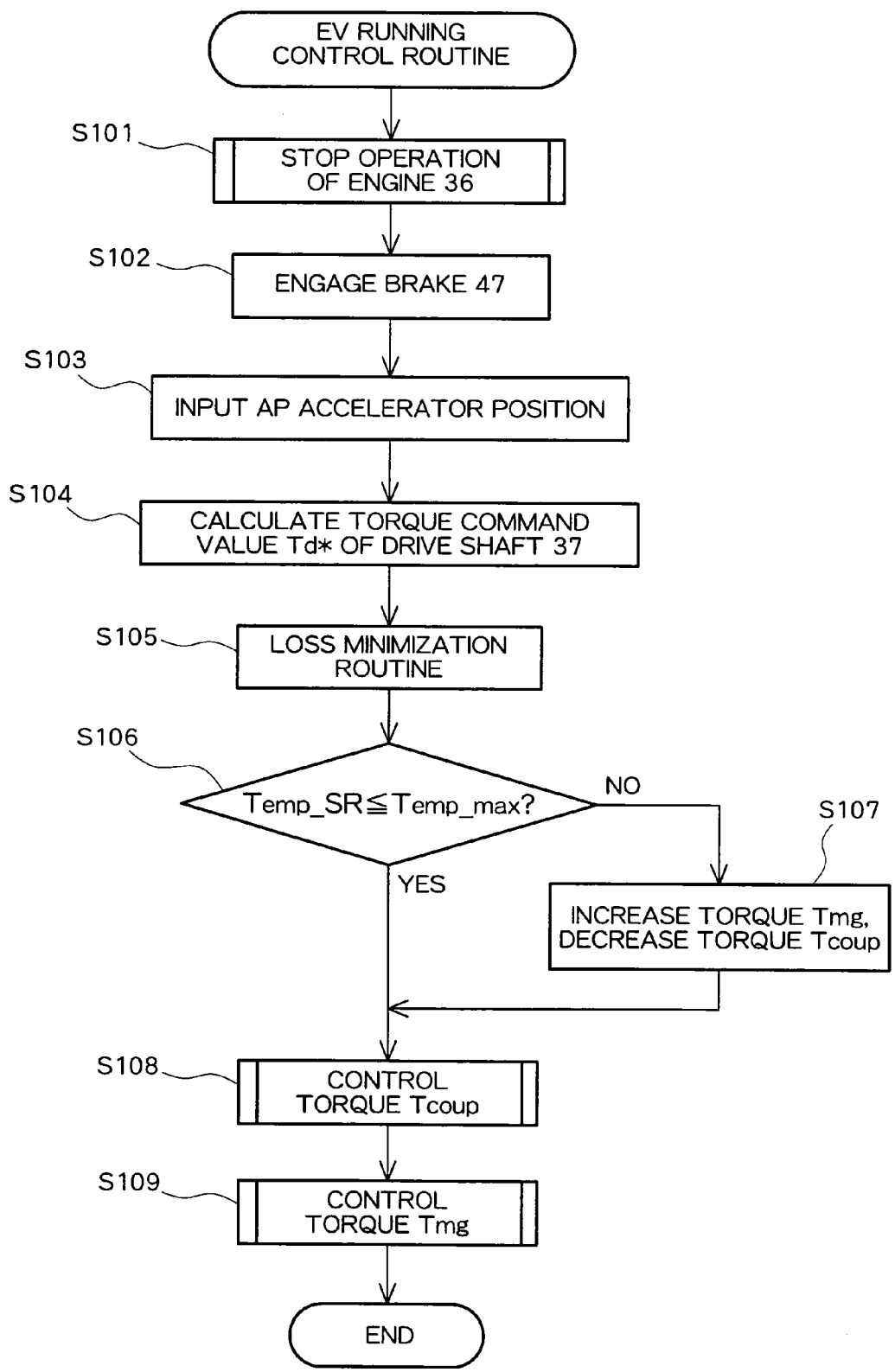
FIG. 8 Flow chart for explaining example processing which is executed for driving the drive shaft 37 with the operation of the engine 36 being stopped.

Further, according to the present embodiment, when executing the EV running in which the drive shaft 37 is driven with the operation of the engine 36 being stopped, allocation is controlled between the torque Tcoup acting between the input-side rotor 28 and the first output-side rotor 18 by the alternating current of the rotor winding 30, and the torque Tmg acting between the stator 16 and the second output-side rotor 19 by the alternating current of the stator winding 20, based on the temperature of the brush 96 (of the slip ring 95). Hereinafter, processing (EV running control routine) executed by the electronic control unit 50 for such allocation control will be described in regard to the flow chart illustrated in FIG. 8.

In step S101, the operation of the engine 36 is stopped. In step S102, by engaging the brake 47, the rotation of the engine 36 and the input-side rotor 28 is restricted. In step S103, an accelerator pedal position AP is input, and in step S104 the required torque (torque command value) Td* of the drive shaft 37 is calculated from the accelerator pedal position AP. In step S105, a loss minimization routine is executed for calculating the torques Tcoup and Tmg so as to minimize the value of a total loss of the first and second rotary electric machines 10 and 11 with respect to the given torque command value Td* of the drive shaft 37. The loss minimization routine will be described in detail below.

In step S106, it is determined whether or not the temperature Temp_SR of the brush 96 obtained by the temperature sensor 97 is the allowable temperature Temp_max or lower. If the temperature Temp_SR of the brush 96 is higher than the allowable temperature Temp_max (if the determination result in step S106 is NO), the process proceeds to step S107. In step S107, under the condition that the torque Tcoup/r+Tmg (r is a velocity ratio of the transmission mechanism 56) of the drive shaft 37 is not changed, the torque Tmg between the stator 16 and the second output-side rotor 19 is increased by a predetermined amount ΔT1 with respect to the value calculated in step S105, and also the torque Tcoup between the input-side rotor 28 and the first output-side rotor 18 is decreased by an amount of r×ΔT1 with respect to the valued calculated in step S105. In step S108, the torque Tcoup between the input-side rotor 28 and the first output-side rotor 18 is controlled to the value which was decreased in step S107, and in step S109, the torque Tmg between the stator 16 and the second output-side rotor 19 is controlled to the value which was increased in step S107.

If the temperature Temp_SR of the brush 96 is the allowable temperature Temp_max or lower (the determination result in step S106 is YES), the process proceeds to step S108. In step S108, the torque Tcoup between the input-side rotor 28 and the first output-side rotor 18 is controlled to the value calculated in step S105, and in step S109, the torque Tmg between the stator 16 and the second output-side rotor 19 is controlled to the value calculated in step S105.

Figure 9:
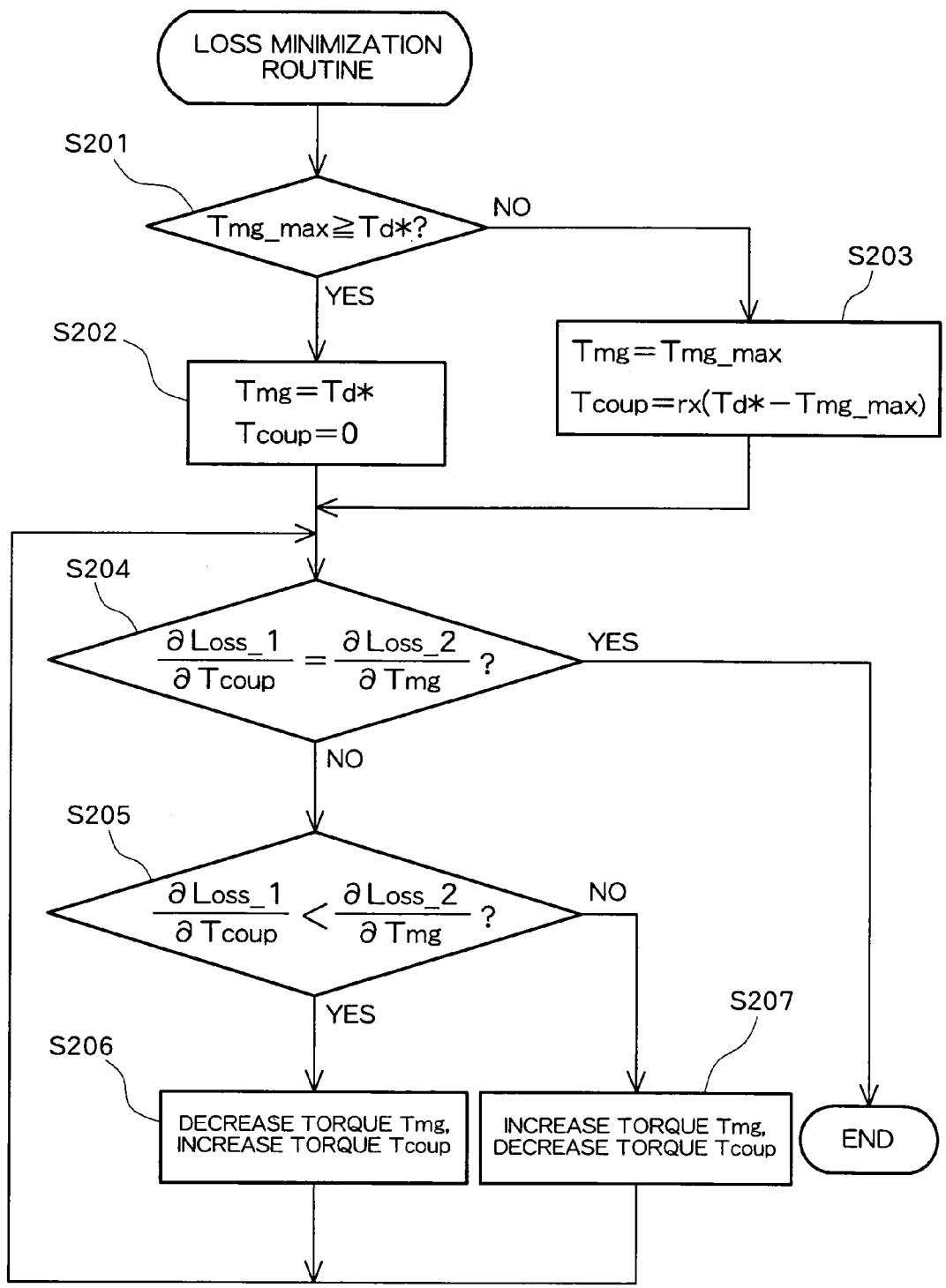
FIG. 9 Flow chart for explaining example processing which is executed for driving the drive shaft 37 with the operation of the engine 36 being stopped.

In the loss minimization routine, the processing illustrated in the flowchart of FIG. 9 is executed by the electronic control unit 50. In step S201, it is determined whether or not the torque command value Td* of the drive shaft 37 is equal to or less than the maximum value Tmg_max of the torque between the stator 16 and the second output-side rotor 19. In the case of Tmg_max≥Td* (the determination result in step S201 is YES), the process proceeds to step S202 where the torque Tmg between the stator 16 and the second output-side rotor 19 is set to Td*, and the torque Tcoup between the input-side rotor 28 and the first output-side rotor 18 is set to 0. In the case of Tmg_max<Td* (the determination result in step S201 is NO), the process proceeds to step S203. In step S203, in order make the torque Tcoup/r+Tmg of the drive shaft 37 Td*, the torque Tmg between the stator 16 and the second output-side rotor 19 is set to Tmg_max, and the torque Tcoup between the input-side rotor 28 and the first output-side rotor 18 is set to r×(Td*−Tmg_max).

Figure 10:
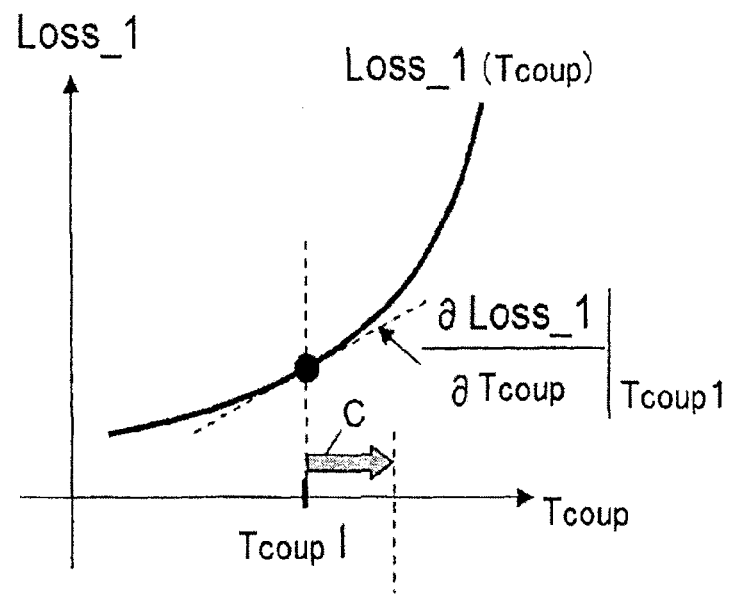
FIG. 10 View showing an example property of a loss Loss_1 (Tcoup) with respect to torque Tcoup of the first rotary electric machine 10.
Figure 11:
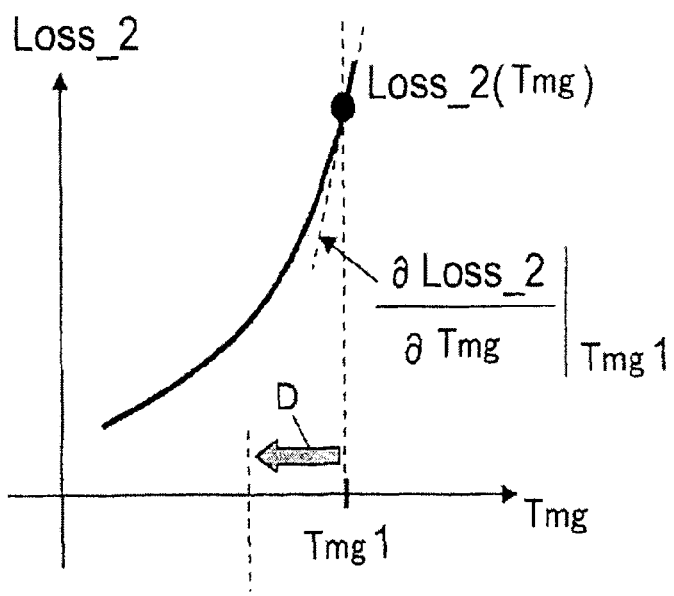
FIG. 11 View showing an example property of a loss Loss_2 (Tmg) with respect to torque Tmg of the second rotary electric machine 11.

In step S204, whether or not the following formula (1) is established is determined. In both the first and second rotary electric machines 10 and 11, with the rotational speed being fixed, the loss is generally in proportion to a square of the torque. Accordingly, with properties of the loss (monotonous increase, convex function) with respect to the torque as illustrated in FIGS. 10 and 11 being given to each of the first and second rotary electric machines 10 and 11, the loss property with respect to the torque Tcoup of the first output-side rotor 18 of the first rotary electric machine 10 can be represented by Loss_1 (Tcoup) as illustrated in FIG. 10, and the loss property with respect to the torque Tmg of the second output-side rotor 19 of the second rotary electric machine 11 can be represented by Loss_2 (Tmg) as illustrated in FIG. 11. The property of the loss Loss_1 (Tcoup) with respect to the torque Tcoup of the first output-side rotor 18 of the first rotary electric machine 10 and the property of the loss Loss_2 (Tmg) with respect to the torque Tmg of the second output-side rotor 19 of the second rotary electric machine 11 as illustrated in FIGS. 10 and 11 are prestored in a storage device of the electronic control unit 50. At an operating point where Td*=Tcoup/r+Tmg is satisfied, if the following equation (1) cannot be established, that is, if the loss increase ratio ∂Loss_1/∂ Tcoup with respect to the torque increase of the first output-side rotor 18 and the loss increase ratio ∂Loss_2/∂ Tmg with respect to the torque increase of the second output-side rotor 19 are not equal to each other, the process proceeds to step S205.

[Mathematical Formula 1]

$$\frac{\partial \text{Loss\_1}}{\partial T_{comp}} = \frac{\partial \text{Loss\_2}}{\partial T_{mg}} \quad (1)$$

In step S205, whether or not the following formula (2) can be established is determined. As illustrated in FIGS. 10 and 11, at the operating points where Tcoup=Tcoup1 and Tmg=Tmg1, and Td*=Tcoup1/r+Tmg1 are satisfied, for example, the loss increase ratio ∂Loss_1/∂Tcoup with respect to the torque increase of the first output-side rotor 18 is smaller than the loss increase ratio ∂Loss_2/∂Tmg of the torque increase of the second output-side rotor 19, and the following inequality of mathematical formula (2) is satisfied. In this case, the process proceeds to step S206, where, under the condition that the torque Tcoup/r+Tmg of the drive shaft 37 remains unchanged, the torque Tmg of the second output-side rotor 19 is decreased from Tmg1 in the direction of arrow D in FIG. 11 by a predetermined amount ΔT2, and also the torque Tcoup of the first output-side rotor 18 is increased from Tcoup1 in the direction of arrow C in FIG. 10 by an amount of r×ΔT2 to thereby shift the operating points. With this operation, a value of the sum of the loss Loss_1(Tcoup) of the first rotary electric machine 10 and the loss Loss_2 (Tmg) of the second rotary electric machine 11 is decreased. The process then returns to step S204. On the other hand, at the operating point where Td*=Tcoup/r+Tmg is satisfied, if the following inequality of the formula (2) is not satisfied, that is, if the loss increase ratio ∂Loss_1/∂Tcoup with respect to the torque increase of the first output-side rotor 18 is larger than the loss increase ratio ∂Loss_2/∂Tmg with respect to the torque increase of the second output-side rotor 19, the process proceeds to step S207. In step S207, under the condition that the torque Tcoup/r+Tmg of the drive shaft 37 remains unchanged, the torque Tmg of the second output-side rotor 19 is increased by a predetermined amount ΔT2 and also the torque Tcoup of the first output-side rotor 18 is decreased by an amount r×ΔT2, thereby shifting the operating points. With this operation, a value of the sum of the loss Loss_1(Tcoup) of the first rotary electric machine 10 and the loss Loss_2 (Tmg) of the second rotary electric machine 11 is decreased. The process then returns to step S204.

[Mathematical Formula 2]

$$\frac{\partial \text{Loss\_1}}{\partial T_{comp}} < \frac{\partial \text{Loss\_2}}{\partial T_{mg}} \quad (2)$$

Figure 12:
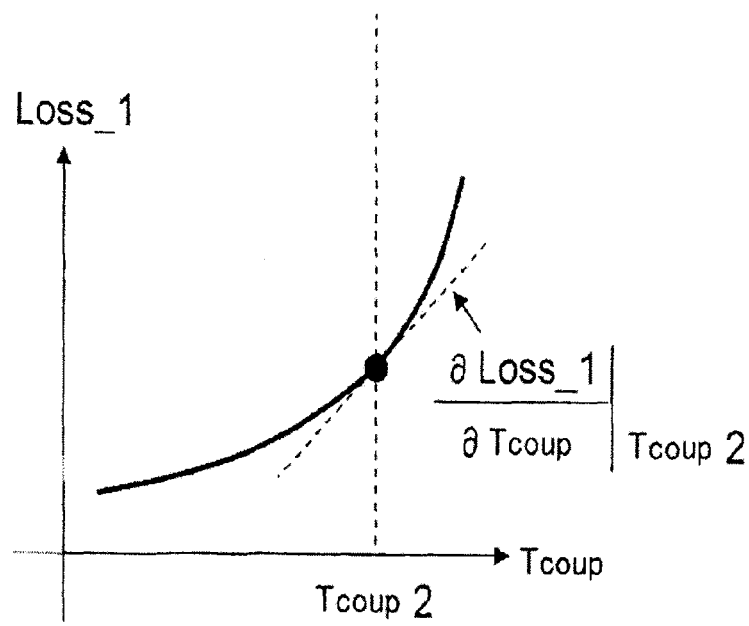
FIG. 12 View showing an example property of a loss Loss_1 (Tcoup) with respect to torque Tcoup of the first rotary electric machine 10.
Figure 13:
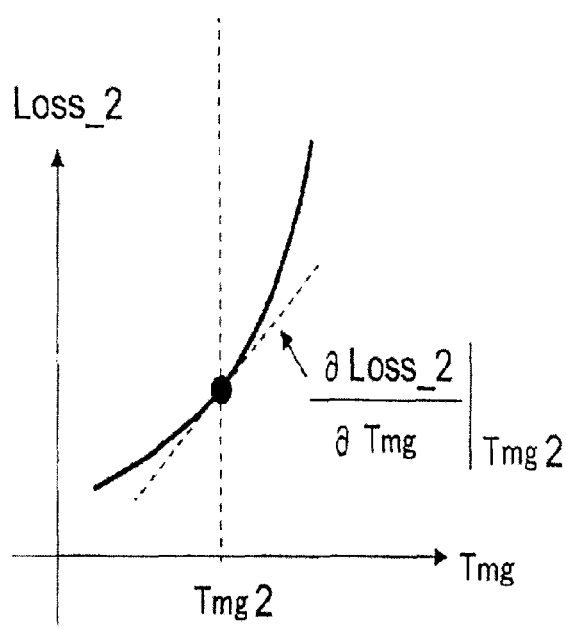
FIG. 13 View showing an example property of a loss Loss_2 (Tmg) with respect to torque Tmg of the second rotary electric machine 11.

In step S204, if the formula (1) is established, execution of the loss minimization routine is terminated. As illustrated in FIGS. 12 and 13, for example, at the operating points where Tcoup=Tcoup2 and Tmg=Tmg2, and Td*=Tcoup2/r+Tmg2 are satisfied, the loss increase ratio ∂Loss_1/∂Tcoup with respect to the torque increase of the first output-side rotor 18 and the loss increase ratio ∂Loss_2/∂Tmg with respect to the torque increase of the second output-side rotor 19 are equal to each other. At the operating points where the formula (1) is established, a value of the sum of the loss Loss_1 (Tcoup) and the loss Loss_2 (Tmg) is minimum.

In a state where the rotation of the engine 36 and the input-side rotor 28 is fixed by engagement of the brake 47, the location of energization of the slip ring 95 (the location of the slip ring 95 contacting the brush 96) is locally fixed. If, in order to increase the drive torque of drive shaft 37 during the EV running, electrical current applied to the rotor winding 30 of the input-side rotor 28 is increased to thereby increase the torque Tcoup between the input-side rotor 28 and the first output-side rotor 18 in this state, local overheating of the slip ring 95 would be likely to occur. According to the EV running control routine described above, when the temperature Temp_SR of the brush 96 is higher than the allowable temperature Temp_max, compared to when the temperature Temp_SR of the brush 96 is the allowable temperature Temp_max or lower, allocation of the torque Tcoup between the input-side rotor 28 and the first output-side rotor 18 with respect to the required torque Td* for the drive shaft 37 is decreased to increase the allocation of the torque Tmg between the stator 16 and the second output-side rotor 19 with respect to the required torque Td* of the drive shaft 37. This control makes it possible to cover the required torque of the drive shaft 37 by the torque Tcoup between the input-side rotor 28 and the first output-side rotor 18 and the torque Tmg between the stator 16 and the second output-side rotor 19. Also, when the temperature Temp_SR of the brush 96 is higher than the allowable temperature Temp_max, compared to when the temperature Temp_SR of the brush 96 is the allowable temperature Temp_max or lower, the electric current applied to the slip ring 95 and the brush 96 is decreased. As a result, the maximum drive torque of the drive shaft 37 during the EV running can be increased while preventing the local overheating of the slip ring 95.

The loss minimization routine is also executed to control the allocation of the torques Tcoup and Tmg with respect to the required torque Td* of the drive shaft 37, such that, when temperature Temp_SR of the brush 96 is the allowable temperature Temp_max or lower, the loss increase ratio ∂Loss_1/∂Tcoup with respect to the torque increase of the first output-side rotor 18 of the first rotary electric machine 10 and the loss increase ratio ∂Loss_2/∂Tmg with respect to the torque increase of the second output-side rotor 19 of the second rotary electric machine 11 are equal to each other. This control makes it possible to execute the EV running such that the loss of the first and second rotary electric machines 10 and 11 is minimized to thereby increase the efficiency during the EV running. Also, when the temperature Temp_SR of the brush 96 is higher than the allowable temperature Temp_max, compared to the allocation of the torques Tcoup and Tmg by which the loss increase ratios ∂Loss_1/∂Tcoup and ∂Loss_2/∂Tmg are equal to each other, the allocation of the torque Tcoup with respect to the required torque Td* of the drive shaft 37 is decreased to increase the allocation of the torque Tmg with respect to the required torque Td* of the drive shaft 37. This control makes it possible to prevent the local overheating of the slip ring 95 while reducing the loss of the first and second rotary electric machines 10 and 11 to some extent during the EV running.

When executing the EV running control routine, it is also possible to detect the temperature of the slip ring 95 by the temperature sensor, in place of the temperature Temp_SR of the brush 96, and determine, in step S106, whether or not the temperature of the slip ring 95 detected by the temperature sensor is the allowable temperature Temp_max or lower. If the temperature of the slip ring 95 is higher than the allowable temperature Temp_max, the process proceeds to step S107, whereas if the temperature of the slip ring 95 is allowable temperature Temp_max or lower, the process proceeds to step S108.

Figure 14:
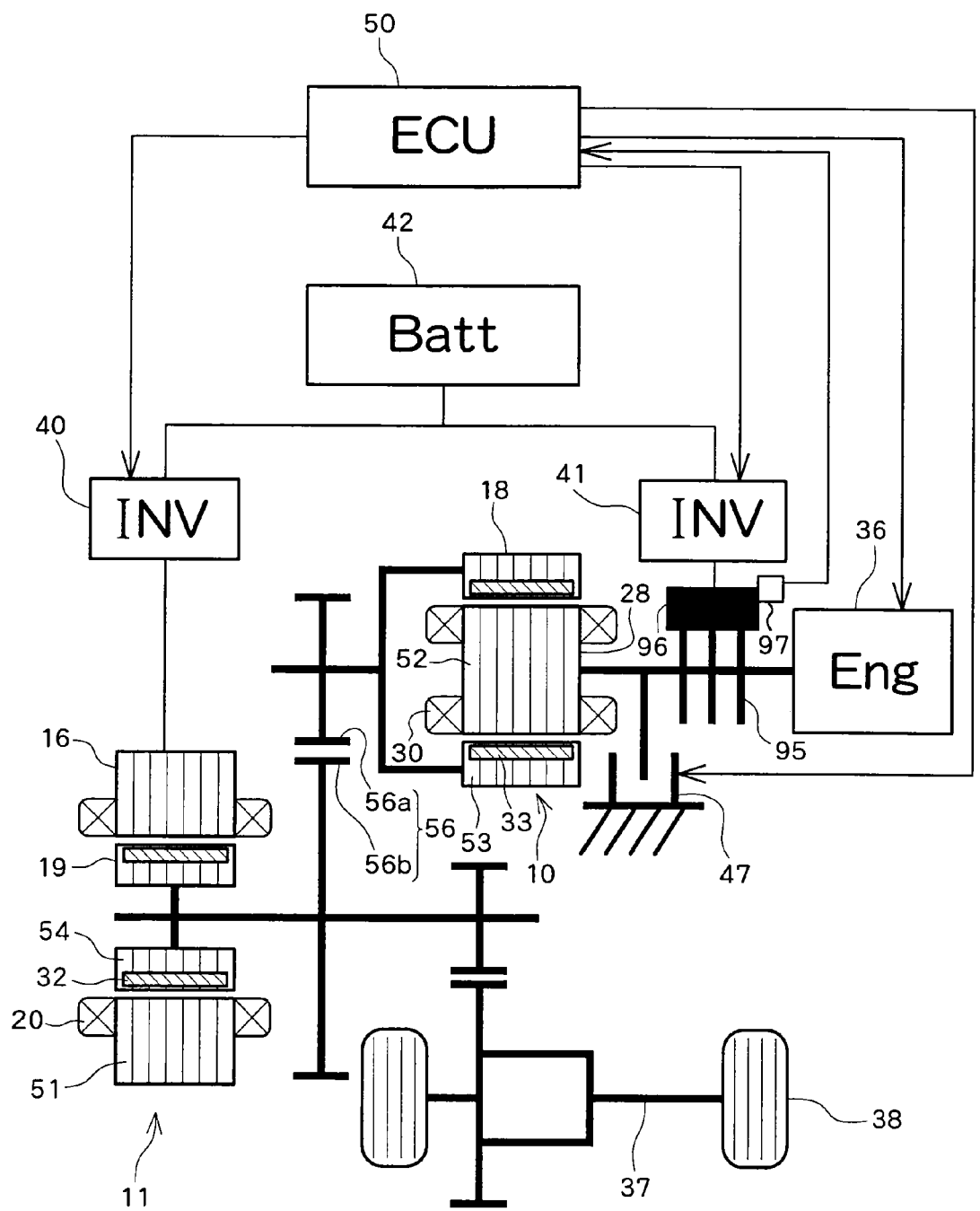
FIG. 14 View schematically illustrating another structure of the hybrid driving apparatus including the power transmission device according to an embodiment of the present invention.

According to the present embodiment, as illustrated in FIG. 14, for example, it is also possible to configure the transmission mechanism 56 as a deceleration mechanism in which a diameter (pitch circle diameter) of the transmission gear 56a is smaller than the diameter (pitch circle diameter) of the transmission gear 56b. In this case, during rotation of the drive shaft 37 (wheel 38), the power from the first output-side rotor 18 is decelerated by the transmission mechanism 56 before being transmitted to the drive shaft 37, and the rotational speed of the second output-side rotor 19 becomes lower than the rotational speed of the first output-side rotor 18. With the example structure illustrated in FIG. 14, as the torque Tcoup between the input-side rotor 28 and the first output-side rotor 18 can be amplified by the transmission mechanism 56 before being transmitted to the drive shaft 37, it is possible to increase the drive torque of the drive shaft 37, which is particularly preferable when the vehicle speed is low.

Figure 15:
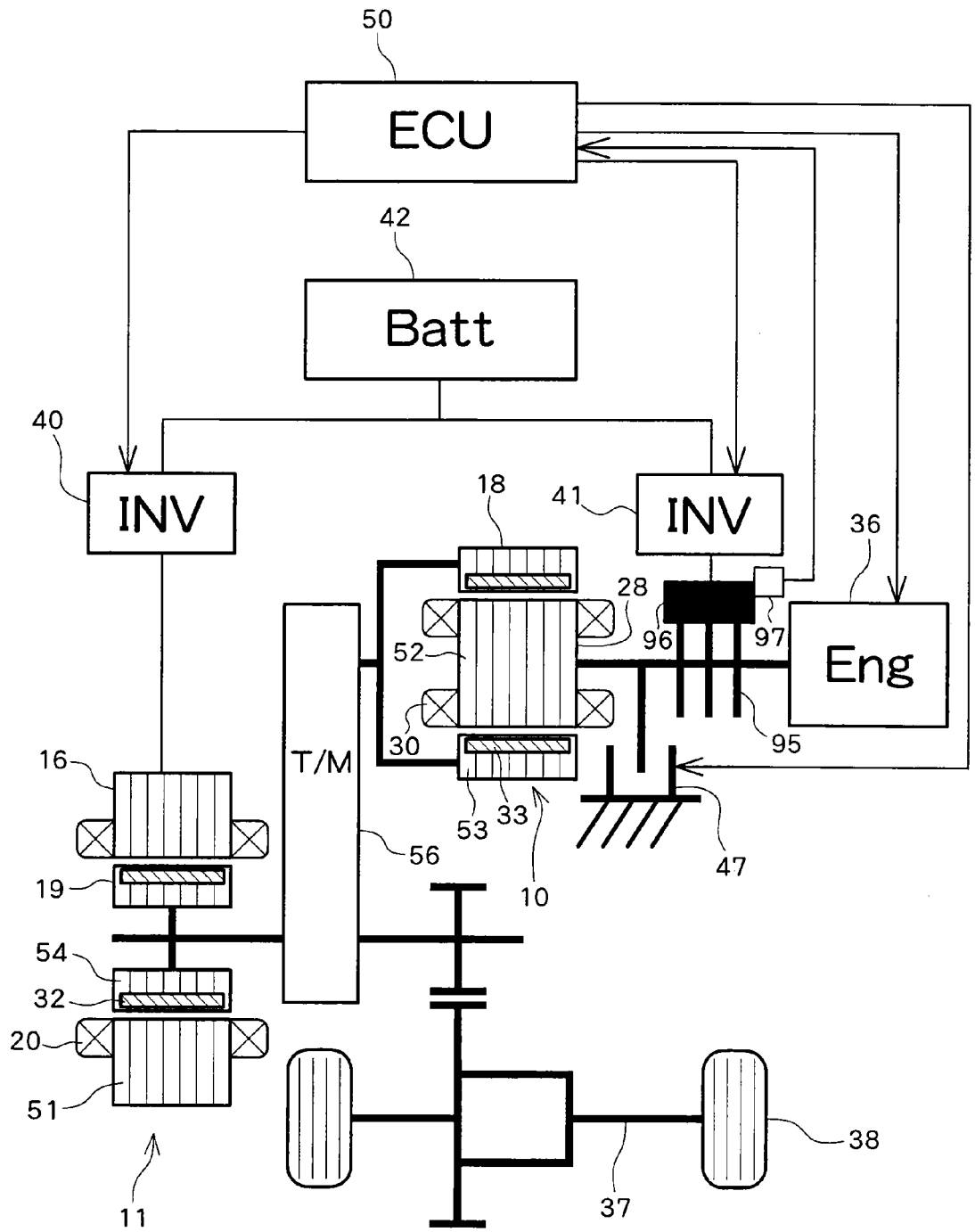
FIG. 15 View schematically illustrating another structure of the hybrid driving apparatus including the power transmission device according to an embodiment of the present invention.

According to the present embodiment, as illustrated in FIG. 15, for example, it is also possible to configure the transmission mechanism 56 as a transmission with a variable gear ratio. The transmission in this example can be selectively switched between the deceleration state in which the power from the first output-side rotor 18 is decelerated before being transmitted to the drive shaft 37 and the acceleration state in which the power from the first output-side rotor 18 is accelerated before being transmitted to the drive shaft 37. In the deceleration state, during rotation of the drive shaft 37, the rotational speed of the second output-side rotor 19 becomes lower than the rotational speed of the first output-side rotor 18, whereas in the acceleration state, during rotation of the drive shaft 37, the rotational speed of the second output-side rotor 19 becomes higher than the rotational speed of the first output-side rotor 18. When the transmission is switched to the deceleration state, it is possible to increase the drive torque of the drive shaft 37, which is particularly preferable when the vehicle speed is low. When the transmission is switched to the acceleration state, on the other hand, it is possible to expand the range of the vehicle speed for performing the power generation operation of the first rotary electric machine 10 (the range of the vehicle speed within which power environment does not occur) toward the higher vehicle speed side, which is particularly preferable when the vehicle speed is high. It is therefore desirable to select the deceleration state of the transmission when the vehicle speed (rotational speed of the drive shaft 37) is the predetermined speed Vs1 or less and select the acceleration state of the transmission when the vehicle speed (rotational speed of the drive shaft 37) is higher than the predetermined speed Vs1.

Figure 16:
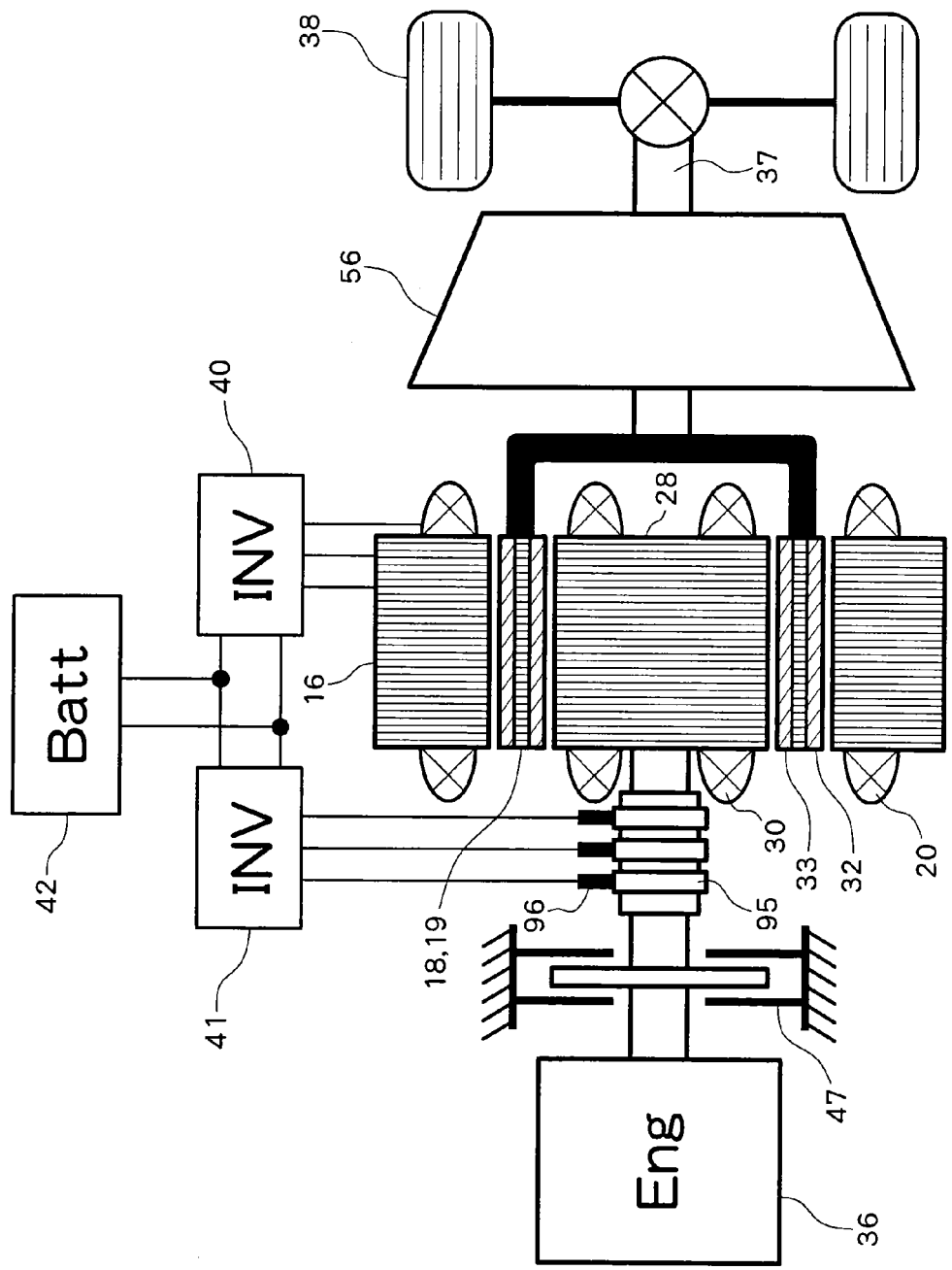
FIG. 16 View schematically illustrating another structure of the hybrid driving apparatus including the power transmission device according to an embodiment of the present invention.

According to the present embodiment, it is also possible to form the first output-side rotor 18 and the second output-side rotor 19 integrally, as illustrated in FIG. 16, for example. In the example illustrated in FIG. 16, the input-side rotor 28, the integrally formed first and second output-side rotors 18 and 19, and the stator 16 are disposed concentrically, such that the first and the second output-side rotors 18 and 19 are disposed on the outer circumferential side of the input-side rotor 28 and the stator 16 is disposed on the outer circumferential side of the first and second output-side rotors 18 and 19. The transmission mechanism 56 coupled to the first and second output-side rotors 18 and 19 may be an acceleration mechanism, a deceleration mechanism, or a transmission. The example structure illustrated in FIG. 16 enables downsizing of an apparatus.

While embodiments for implementing the present invention have been described, the present invention is not limited to these examples and can be implemented in various modes without departing from the gist of the present invention.

REFERENCE SIGNS LIST

10 first rotary electric machine, 11 second rotary electric machine, 16 stator, 18 first output-side rotor, 19 second output-side rotor, 20 stator winding, 28 input-side rotor, 30 rotor winding, 32, 33 permanent magnet, 36 engine, 37 drive shaft, 38 wheel, 40, 41 inverter, 42 power storage device, 47 brake, 50 electronic control unit, 51 stator core, 52, 53 rotor core, 56 transmission mechanism, 56a, 56b transmission gear, 95 slip ring, 96 brush, 97 temperature sensor.

The invention claimed is:

1. A power transmission device, comprising:
an input-side rotor configured to receive power transmitted from an engine, the input-side rotor including a rotor conductor which can generate a rotating magnetic field when alternating current flows therethrough;
a first output-side rotor configured to be rotatable relative to the input-side rotor and to transmit power to a drive shaft, torque acting between the first output-side rotor and the input-side rotor in response to exertion of the rotating magnetic field generated by the rotor conductor;
a stator including a stator conductor which can generate a rotating magnetic field when alternating current flows therethrough;
a second output-side rotor configured to rotate with the first output-side rotor and transmit power to the drive shaft, torque acting between the second output-side rotor and the stator in response to exertion of the rotating magnetic field generated by the stator conductor;
a slip ring electrically connected with the rotor conductor, the slip ring rotating with the input-side rotor;
a brush configured to electrically contact the slip ring;
a temperature obtaining section configured to obtain a temperature of either one of the brush and the slip ring; and
a restriction mechanism which can restrict rotation of the input-side rotor,
wherein, when driving the drive shaft with operation of the engine being stopped, the rotation of the input-side rotor is restricted by the restriction mechanism, and further, based on the temperature obtained by the temperature obtaining section, allocation is controlled between the torque acting between the input-side rotor and first output-side rotor by the alternating current of the rotor conductor with respect to a required torque of the drive shaft, and the torque acting between the stator and the second output-side rotor by the alternating current of the stator conductor with respect to the required torque of the drive shaft.

2. The power transmission device according to claim 1, wherein, when driving the drive shaft with the operation of the engine being stopped, if the temperature obtained by the temperature obtaining section is higher than an allowable temperature, the allocation of the torque acting between the input-side rotor and the first output-side rotor by the alternating current of the rotor conductor with respect to the required torque of the drive shaft is decreased to increase the allocation of the torque acting between the stator and the second output-side rotor by the alternating current of the stator conductor with respect to the required torque of the drive shaft, compared to when the temperature obtained by the temperature obtaining section is the allowable temperature or lower.

3. The power transmission device according to claim 1, wherein when driving the drive shaft with the operation of the engine being stopped, if the temperature obtained by the temperature obtaining section is an allowable temperature or lower, the allocation between the torque acting between the input-side rotor and the first output-side rotor by the alternating current of the rotor conductor with respect to the required torque of the drive shaft and the torque acting between the stator and the second output-side rotor by the alternating current of the stator conductor with respect to the required torque of the drive shaft is controlled such that a loss increase ratio with respect to a torque increase of the first output-side rotor and a loss increase ratio with respect to a torque increase of the second output-side rotor are equal to each other.

4. The power transmission device according to claim 3, wherein when driving the drive shaft with the operation of the engine being stopped, if the temperature obtained by the temperature obtaining section is higher than the allowable temperature, the allocation of the torque acting between the input-side rotor and the first output-side rotor by the alternating current of the rotor conductor with respect to the required torque of the drive shaft is decreased to increase the allocation of the torque acting between the stator and the second output-side rotor by the alternating current of the stator conductor with respect to the required torque of the drive shaft, with respect to the torque allocation by which the loss increase ratio of the first output-side rotor with respect to the torque increase and the loss increase ratio of the second output-side rotor with respect to the torque increase are equal to each other.

5. The power transmission device according to claim 1, wherein the first output-side rotor and the second output-side rotor are formed integrally.

* * * * *